US011856929B2

(12) United States Patent
Ruboyianes

(10) Patent No.: US 11,856,929 B2
(45) Date of Patent: Jan. 2, 2024

(54) FLASHER FISHING LURE

(71) Applicant: Shane Ruboyianes, Ludington, MI (US)

(72) Inventor: Shane Ruboyianes, Ludington, MI (US)

(73) Assignee: Shane Ruboyianes, Ludington, MI (US)

( * ) Notice: Subject to any disclaimer, the term of this patent is extended or adjusted under 35 U.S.C. 154(b) by 89 days.

(21) Appl. No.: 17/678,001

(22) Filed: Feb. 22, 2022

(65) Prior Publication Data

US 2022/0264857 A1     Aug. 25, 2022

Related U.S. Application Data

(60) Provisional application No. 63/151,793, filed on Feb. 21, 2021.

(51) Int. Cl.
*A01K 85/14* (2006.01)
*A01K 85/01* (2006.01)
*A01K 85/00* (2006.01)

(52) U.S. Cl.
CPC ............ *A01K 85/14* (2013.01); *A01K 85/013* (2022.02); *A01K 85/1853* (2022.02)

(58) Field of Classification Search
CPC .. A01K 85/14; A01K 85/1853; A01K 85/013; A01K 85/12; A01K 85/00
USPC .................................................. 43/42.2, 42.5
See application file for complete search history.

(56) References Cited

U.S. PATENT DOCUMENTS

| | | | | |
|---|---|---|---|---|
| 1,115,743 A | * | 11/1914 | Selig ...................... | A01K 85/14 D22/129 |
| 1,914,211 A | * | 6/1933 | Novitzky ................ | A01K 85/14 43/42.5 |
| 2,235,905 A | * | 3/1941 | Sherwood .............. | A01K 85/14 D22/129 |
| 2,236,023 A | * | 3/1941 | Turner ................... | A01K 85/14 D22/129 |
| 2,480,580 A | * | 8/1949 | Hopkins ................ | A01K 85/14 43/42.34 |
| 2,575,609 A | * | 11/1951 | Alderman .............. | A01K 85/14 43/42.22 |
| 2,608,787 A | * | 9/1952 | Krogue .................. | A01K 85/14 D22/129 |
| 2,613,470 A | * | 10/1952 | Eslinger ................ | A01K 85/16 43/42.49 |
| 3,055,138 A | * | 9/1962 | Mutti ..................... | A01K 85/14 43/42.22 |
| 3,056,228 A | | 10/1962 | Edward et al. | |

(Continued)

*Primary Examiner* — Timothy D Collins
*Assistant Examiner* — Maria E Graber
(74) *Attorney, Agent, or Firm* — Bochner PLLC; Andrew D. Bochner

(57) ABSTRACT

Flasher fishing lures are disclosed that include a fin pivotably attached to a rear portion of the flasher. In a closed configuration, the fin may be secured within a fin recess to form a substantially flat, continuous surface with the rear portion of the flasher. And, in an open configuration, the fin may extend substantially perpendicular to the surface of the rear portion. Accordingly, a user may select a fin configuration that provides optimal side-to-side, tail kicking and/or spinning motion of the lure through the water when trolled at various speeds and in any number of fishing conditions.

17 Claims, 2 Drawing Sheets

(56) References Cited

U.S. PATENT DOCUMENTS

| | | | |
|---|---|---|---|
| 3,363,358 A * | 1/1968 | Johansson | A01K 85/14 43/42.31 |
| 3,656,253 A | 4/1972 | Gaunt | |
| 3,673,727 A * | 7/1972 | Bauer | A01K 85/14 43/42.5 |
| 4,122,624 A * | 10/1978 | Smith | A01K 85/14 43/42.5 |
| 4,201,006 A * | 5/1980 | Wetherald | A01K 85/00 43/42.51 |
| 4,637,160 A * | 1/1987 | Biskup | A01K 85/14 43/42.5 |
| 5,003,723 A * | 4/1991 | Dutcher | A01K 85/14 43/42.27 |
| 6,279,260 B1 * | 8/2001 | Farr | A01K 91/06 43/43.12 |
| 6,493,984 B1 | 12/2002 | Bechhold | |
| 6,655,074 B2 * | 12/2003 | Pentland | A01K 91/06 43/43.12 |
| 6,904,712 B1 * | 6/2005 | Gironda | A01K 85/14 43/42.22 |
| 7,028,430 B2 * | 4/2006 | Gironda | A01K 85/14 43/42.22 |
| 8,413,367 B1 * | 4/2013 | Stirtz | A01K 91/065 43/43.13 |
| D873,374 S * | 1/2020 | Gibson | D22/129 |
| D917,658 S * | 4/2021 | Turvey | D22/129 |
| 11,116,196 B2 * | 9/2021 | Gibson | A01K 85/10 |
| 11,388,893 B2 * | 7/2022 | Naumovitz | A01K 85/18 |
| 11,602,138 B2 * | 3/2023 | Gudwer | A01K 85/14 |
| 11,666,043 B2 * | 6/2023 | Turvey | A01K 85/14 43/42.49 |
| 2005/0252069 A1 | 11/2005 | Pool et al. | |
| 2008/0104879 A1 * | 5/2008 | Poppe | A01K 97/02 43/2 |
| 2008/0229649 A1 * | 9/2008 | Smith | B22F 5/10 29/592 |
| 2013/0239458 A1 * | 9/2013 | Hallan | A01K 85/12 43/42.2 |
| 2015/0366178 A1 * | 12/2015 | Bechhold | A01K 91/065 43/17.6 |
| 2018/0288989 A1 * | 10/2018 | Cooper | A01K 97/05 |
| 2020/0100485 A1 * | 4/2020 | Gibson | A01K 85/10 |

* cited by examiner

FLASHER FISHING LURE

CROSS-REFERENCE TO RELATED APPLICATIONS

The present application claims the benefit of priority to U.S. provisional patent application Ser. No. 63/151,793, titled "Flasher Fishing Lure Device," filed Feb. 21, 2021, which is incorporated by reference herein in its entirety.

BACKGROUND

This specification relates generally to fishing lures. More particularly, this specification relates to flasher fishing lures having a fin that is pivotable between opened and closed positions.

Flasher fishing lures are often used when trolling for salmon and trout. Such devices typically include a flat, elongated body with one or more reflective sides and an upturned, upstream end. Generally, flashers are trolled in front of a fishing lure to resemble an adult fish swimming and slashing rapidly, as if feeding. As the flasher is pulled through the water, the device tends to rotate about its point of connection to a fishing line to create a flashing effect, which attracts fish to the lure secured to the downstream end of the flasher.

With respect to the prior art, U.S. Pat. No. 3,056,228 to Stackhouse discloses a flasher having a tapering body with rounded and bent ends. The flasher is said to have a variable motion in the water depending upon the speed at which it is trolled.

U.S. Pat. No. 3,656,253 to Gaunt discloses a flasher that is covered with metallic reflector tape. The flasher is tapered and includes irregularly bent ends such that the flasher spins in large loops—first in one direction and then the other—at constant trolling speeds. The irregular reflective pattern produced by the flasher is said to be attractive to fish.

U.S. Pat. No. 6,493,984 to Bechhold discloses a tapered, flat flasher lure having a straight front stabilizing dorsal fin parallel to a longitudinal axis of the tapered body and an angulated rear fin. When trolled, the flasher is said to produce infundibular rotational motion and a whipping effect that produces sounds particularly attractive to fish.

U.S. Pat. App. Pub. No. 2005/0252069 to Pool discloses an electronic flasher lure having a generally flat, slightly trapezoidal panel with oppositely bent ends and a transversely projecting fin on a rear end thereof. The lure is said to produce an irregular rotating motion when trolled at low speeds.

Unfortunately, currently available flashers are limited in the type and range of motion they provide when trolled. Certain flashers provide significant side-to-side motion, while others provide more rotational motion. The limited motion of conventional flashers results in users having to change out trolling equipment depending on various fishing conditions, such as trolling speed and fish activity. It would be beneficial if a single flasher lure could be adjusted, as desired by a user, to provide optimal fish-attracting motion.

SUMMARY

In accordance with the foregoing objectives and others, exemplary flasher lures are disclosed herein. The flashers include a fin that is pivotably attached to a rear portion thereof. In a closed configuration, the fin may be secured within a fin recess to form a substantially flat, continuous surface with the rear portion. And, in an open configuration, the fin may extend substantially perpendicular to the surface of the rear portion. Accordingly, the disclosed embodiments allow users to select a configuration that provides optimal side-to-side, tail kicking and/or spinning motion of the lure through the water when trolled at various speeds and/or in any number of fishing conditions.

In one aspect of the embodiments, a flasher fishing lure is provided. The flasher may include a body having a substantially rectangular, flat center portion; a rounded front portion extending from a front of the center portion at an upward angle; and a rounded rear portion tapering outwardly from a rear of the center portion at a downward angle. The flasher may also include a mounting assembly extending diagonally across a bottom surface of the rear portion; a fin recess located within the bottom surface of the rear portion; and a fin having front and rear surfaces extending between top and bottom sides. Generally, the top side of the fin may be pivotably mounted to the mounting assembly such that the fin may be moved between closed and open configurations. When the fin is in the closed configuration, the front surface of the fin may be secured within the fin recess and the rear surface of the fin may form a substantially flat and substantially continuous surface with the bottom surface of the rear portion of the body. And when the fin is in the open configuration, the fin may be secured in an upright position, substantially perpendicular to the bottom surface of the rear portion of the body.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various flasher fishing lure embodiments are disclosed herein. The embodiments include a flip-out fin pivotably attached to a bottom surface of a rear portion of the flasher. In a closed configuration, the fin may be secured within a fin recess such that the bottom surface of the flasher is substantially flat and continuous. In an open configuration, the fin may be pivoted away from the fin recess, to an upright position that is substantially perpendicular to the bottom surface. The disclosed embodiments thus allow users to select a configuration that provides optimal motion of the flasher for any number of fishing conditions.

Figure 1:
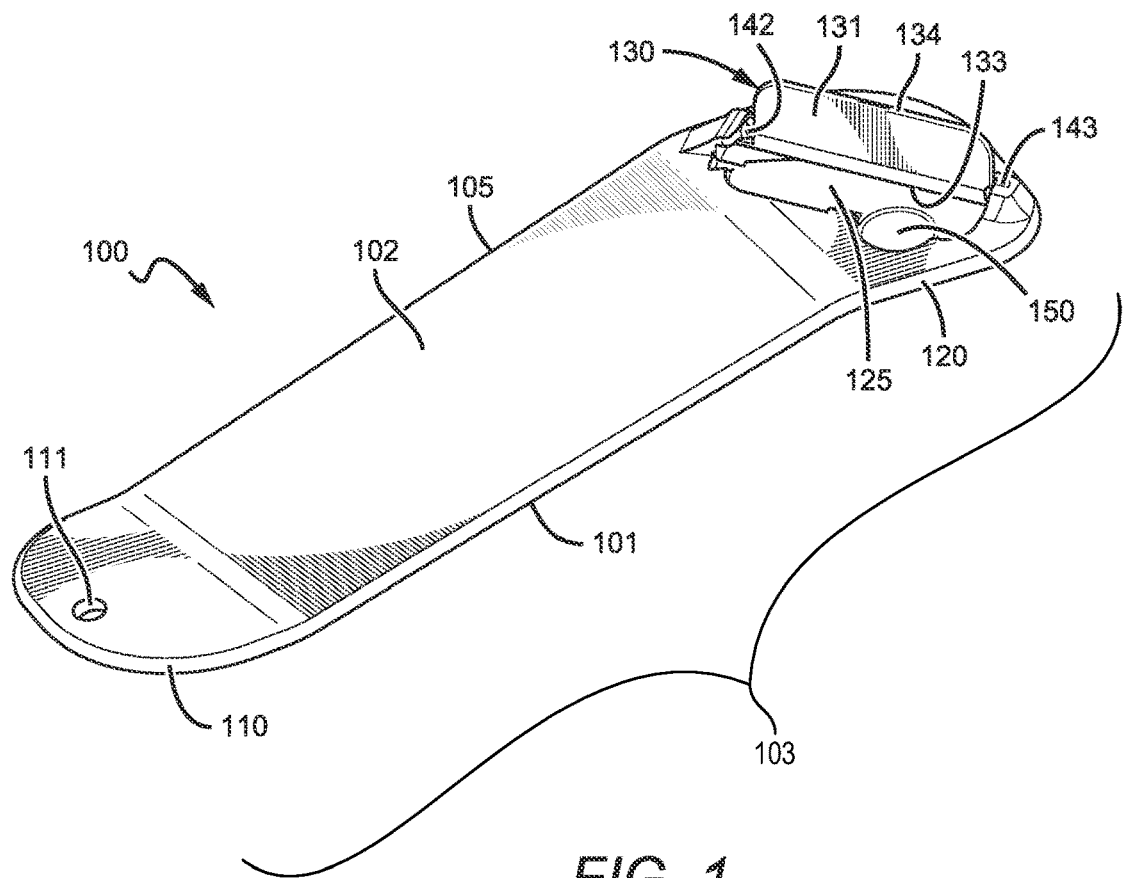
FIG. 1 shows a perspective view of an exemplary flasher lure 100 having a fin 130 pivoted to an open configuration.
Figure 2:
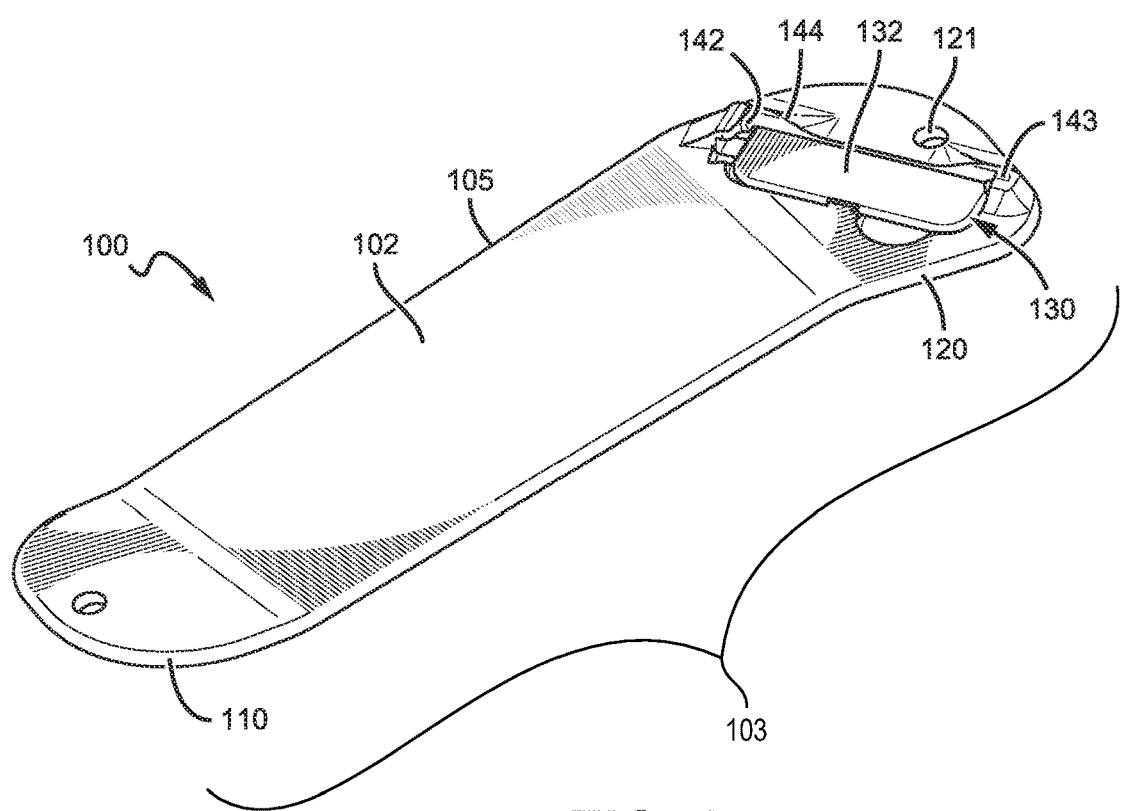
FIG. 2 shows a bottom perspective view of the exemplary flasher lure 100, wherein the fin 130 is in a closed configuration.
Figure 3:
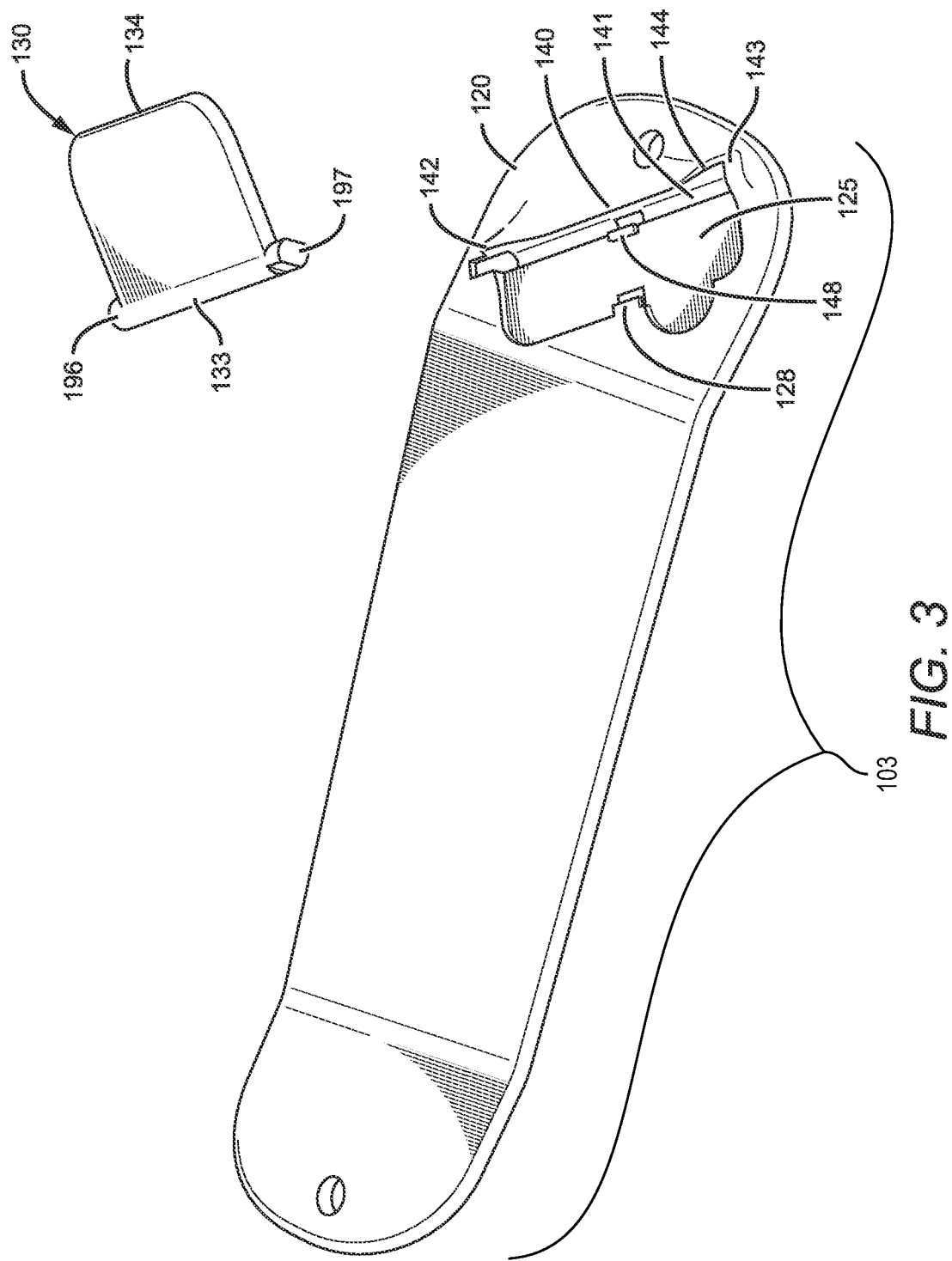
FIG. 3 shows a bottom perspective view of the exemplary flasher lure 100, wherein the fin 130 is removed from the fin recess 125.

Referring to FIGS. 1-3, various views of an exemplary flasher fishing lure 100 according to an embodiment are illustrated. As shown, the flasher 100 comprises a body 103 having a top surface 101 and a bottom 102 surface. The body 103 comprises a generally rectangular, substantially flat center portion 105 extending between rounded front and rear portions 110, 120. The body 103 may be tapered such that the rear portion 120 is slightly wider than the front portion 110.

In one embodiment, the rounded front and rear end portions 110, 120 may be bent in opposite directions away from the center portion 105. For example, the front portion 110 may be bent upward from the center portion 105 at an angle of about 30 degrees, and the rear portion 120 may be bent downward from the center portion at a substantially similar angle.

The front and rear portions 110, 120 may further be angulated from an orientation of perpendicular to a longitudinal centerline of the body 103. For example, the front portion 110 may be angulated about 10 degrees right of the longitudinal centerline, while the rear portion 120 may be angulated about 10 degrees left thereof. In such cases, the front and rear portions 110, 120 may have substantially equal degrees of angulation.

As shown, the bent front and rear portions 110, 120 of the lure 100 include apertures 111, 121 positioned on a centerline of the body 103. Typically, a fishing line may be attached to the front aperture 111, while the rear aperture 121 may be utilized to trail a variety of lures or hooks.

Generally, the body 103 may comprise a length of from about 6 inches to about 12 inches. For example, the body 103 may comprise a length of about 8 inches or about 11 inches. It will be appreciated that the center portion 105 extends about 60 percent of the length of the body 103, while the front and rear portions 110, 120 each extend about 20 percent of the length of the body. Typically, the front and rear portions 110, 120 will comprise equal lengths.

The body 103 further comprises a width of from about 2 inches to about 3 inches. For example, the body 103 may comprise a width of about 2 inches, about 2.5 inches or about 3 inches. As noted above, the body may be tapered such that the rear portion 120 is slightly wider than the front portion 110. This configuration has been shown to provide optimal tail kicking and rotating action to attract fish.

The body 103 is relatively thin and may comprise plastic materials (e.g., molded plastic), metal (e.g., stamped metal plate), or other suitable materials having sufficient strength to withstand trolling conditions. In certain embodiments, the top and/or bottom surface(s) 101, 102 may comprise a light-responsive material, such as a reflective, holographic, and/or luminescent material in the form of adhesive tape. Such material(s) can be applied to the center portion 105 of the body 103 and, optionally, to the front and rear portions 110, 120 thereof to produce a flashing effect in the water, which attracts fish to the lure. In one embodiment where the body 103 is fabricated from a transparent or semitransparent material, the light-responsive material may be sandwiched between a top and bottom layer of the body.

As shown in FIGS. 1-3, the flasher 100 comprises a fin 130 pivotably mounted to a mounting assembly 140 formed along the bottom surface 102 of the body 103, at the rear portion 120 thereof. The fin 130 is shown in an open configuration in FIG. 1 and in a closed configuration in FIG. 2. The flasher 100 is illustrated with the fin 130 removed from the mounting assembly 140 in FIG. 3.

Generally, the fin 130 of the disclosed embodiments is configured to be manually pivoted between open and closed positions. In an open position, the fin 130 extends downward, perpendicularly from the bottom surface 102 of the lure. And in a closed position, the fin 130 extends in a direction parallel to the bottom surface 102.

It will be appreciated that the open position may provide for increased rotational motion of the flasher lure within the water during trolling, while the closed position may provide for increased side-to-side motion. The open position may be desired to attract fish during less active feeding times and/or when the lure is trolled at a speed below that which is required to cause a finless lure to rotate effectively (e.g., less than about 2 mph). Alternatively, the closed position may be desired when trolling the lure during active feeding times and/or at speeds above about 2 mph.

As shown, the fin 130 comprises a rounded rectangular shape, with substantially flat front and rear surfaces 131, 132 extending between top and bottom sides 133, 134. The fin 130 is generally shaped to extend diagonally, substantially across a width of the rear portion 120 of the body 103. The fin may extend diagonally across the bottom surface of the rear portion at about a 35 degree angle from a longitudinal axis of the body.

In one embodiment, the fin 130 may comprise a length that is equal to from about 70% to about 90% of the width of the lure body 103 (e.g., about 80%). For example, in an embodiment where the body 103 comprises a width of about 2.5 inches, the fin 130 may comprise a length of about 2 inches.

The fin 130 may further comprise a height (i.e., a distance between the top and bottom sides 133, 134) of from about 0.5 inches to about 1 inch. In one particular embodiment, the fin may comprise a height of about 0.625 inches.

As shown, the top side 133 of the fin 130 is configured to be pivotably mounted to the body 103, while the bottom side 134 of the fin is free to rotate forward and backward with respect to the body. To that end, the top side 133 of the fin may form or otherwise comprise pivot pins 196, 197 that extend away from the top side, in opposite directions parallel to the top side.

The fin 130 may be pivotably mounted to a mounting assembly 140 that extends diagonally, substantially across the width of the bottom surface 102 of the rear portion 120 of the body 103. Like the fin, the mounting assembly may extend diagonally across the bottom surface of the rear portion at about a 35 degree angle from a longitudinal axis of the body As shown, the mounting assembly 140 may comprise a groove 141 having a shape and size that corresponds to the shape and size of the top side 133 of the fin 130. The groove 141 may be partially surrounded by a pair of side walls 142, 143 and a rear wall 144 extending therebetween, wherein the walls extend perpendicularly away from the bottom surface 102.

The walls 142-144 of the mounting assembly 140 are configured to pivotably secure the top side 133 of the fin within the groove 141. Accordingly, in one embodiment, each side wall 142, 143 may comprise an aperture configured to receive the respective pivot pin extending from the top side 133 of the fin 130 therewithin.

In one embodiment, the mounting assembly 140 comprises a securing element 148 to prevent the top side 133 of the fin 130 from rotating within groove 141 when the fin is placed in the open position. As shown, the securing element 148 may comprise a projection that extends backwards from a position in front of the groove 141 to thereby contact the fin front surface 131 when the fin 130 is pivoted to the open position. The securing element 148 may exert a backward force on the front surface 131 to prevent the fin 130 from rotating forward during use. However, a user may exert a forward force on the fin rear surface 132 that overcomes the backward force exerted by the securing element 148 to rotate the fin 130 into the closed position.

In one embodiment, the mounting assembly 140 may be integrally formed with the body 103 of the flasher 100. In other embodiments, one or more walls 142-144 of the mounting assembly 140 may comprise a separate structure attached to the bottom surface 102 of the body 103 (e.g., via one or more fasteners, an adhesive or the like).

As shown, the flasher 100 may further comprise a fin recess 125 adapted to receive the front side 131 of the fin 130 therewithin when the fin is in the closed position. The fin recess 125 may generally be sized and shaped such that, when the fin 130 is seated within the recess, the rear surface 132 of the fin is substantially parallel to, and substantially continuous with, the bottom surface 102 of the lure body 103.

In one embodiment, the fin recess 125 may include a catch element 128 that releasably secures the fin 130 within the fin recess. As shown, the catch element 128 may extend backwards from a front of the fin recess 125, such that the catch element contacts the bottom side 132 of the fin 130 when the fin is seated within the fin recess 125. This significantly improves the retaining forces and prevents the fin 130 from pivoting out of the fin recess 125 during use of the lure. Nevertheless, a user may overcome the retaining force and release the bottom edge 132 of the fin from the catch element 128 by, for example, inserting a finger into a cutout 150 extending into the fin recess 125 and pulling downward on the fin (i.e., away from the body 103).

The above configuration provides a fin 130 that is pivotably attached to a bottom surface 102 of the flasher. In a closed configuration, the fin 130 may be secured within the fin recess 125 such that rear surface 132 forms a substantially flat and continuous surface with the bottom surface 102 of the flasher body 103. In an open configuration, the bottom side 134 of the fin 130 is pivoted away from the fin recess 125, such that the fin is secured in an upright position, substantially perpendicular to the bottom surface 102. Accordingly, the disclosed embodiments allow users to select a configuration that provides optimal side-to-side, tail kicking and/or spinning motion of the lure through the water when trolled at various speeds and/or in any number of fishing conditions.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references, including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A flasher fishing lure comprising:
    a body comprising:
        a substantially rectangular, flat center portion;
        a rounded front portion extending from a front of the center portion at an upward angle; and
        a rounded rear portion tapering outwardly from a rear of the center portion at a downward angle;
    a mounting assembly extending diagonally across a bottom surface of the rear portion;
    a fin recess located within the bottom surface of the rear portion; and
    a fin comprising front and rear surfaces extending between top and bottom sides, the top side pivotably mounted to the mounting assembly such that the fin may be moved between closed and open configurations,
    wherein, when the fin is in the closed configuration, the front surface of the fin is secured within the fin recess and the rear surface of the fin forms a substantially flat and substantially continuous surface with the bottom surface of the rear portion of the body,
    wherein, when the fin is in the open configuration, the fin is secured in an upright position, substantially perpendicular to the bottom surface of the rear portion of the body, and
    wherein the fin recess comprises a catch element that releasably secures the fin within the fin recess when the fin is in the closed configuration.

2. The flasher fishing lure according to claim 1, wherein the mounting assembly and the fin extend diagonally across the bottom surface of the rear portion of the body at about a 35 degree angle from a longitudinal axis of the body.

3. The flasher fishing lure according to claim 1, wherein the upward angle and the downward angle each comprise about 30 degrees.

4. The flasher fishing lure according to claim 1, wherein the rounded front and rear portions are angulated in opposite directions relative to a longitudinal axis of the center portion.

5. The flasher fishing lure according to claim 1, wherein the body comprises a plastic or metal material.

6. The flasher fishing lure according to claim 1, further comprising a reflective adhesive applied to a top surface and/or bottom surface of the body.

7. The flasher fishing lure according to claim 1, wherein the front and rear portions each comprise an aperture positioned on a centerline of the body.

8. The flasher fishing lure according to claim 1, wherein the mounting assembly comprises a groove having a shape and size that corresponds to a shape and size of the top side of the fin.

9. The flasher fishing lure according to claim 8, wherein the mounting assembly comprises a plurality of walls partially surrounding the groove, the plurality of walls comprising a rear wall extending between a pair of side walls.

10. The flasher fishing lure according to claim 9, wherein the plurality of walls are configured to pivotably secure the top side of the fin within the groove.

11. The flasher fishing lure according to claim 10, wherein:
the top side of the fin comprises a pair of pivot pins extending outward in opposite directions; and
each of the side walls of the mounting assembly comprises an aperture configured to receive one of the pivot pins therewithin.

12. The flasher fishing lure according to claim 8, wherein the mounting assembly comprises a securing element to prevent the top side of the fin from rotating within groove when the fin is in the open position.

13. The flasher fishing lure according to claim 1, wherein the fin comprises a substantially rounded rectangular shape.

14. The flasher fishing lure according to claim 13, wherein the fin comprises a length of about 2 inches and a height of about from about 0.5 inches to about 1 inch.

15. The flasher fishing lure according to claim 1, wherein the body comprises a length of from about 6 inches to about 12 inches.

16. The flasher fishing lure according to claim 15, wherein:
the center portion comprises a length that is equal to about 60% of the length of the body; and
the rounded front and rear portions each comprise a length that is equal to about 20% of the length of the body.

17. The flasher fishing lure according to claim 15, wherein the body comprises a width of from about 2 inches to about 3 inches.

* * * * *